W. F. KETCHUM.
Harvester Rake.
No. 14,102.    Patented Jan. 15, 1856.
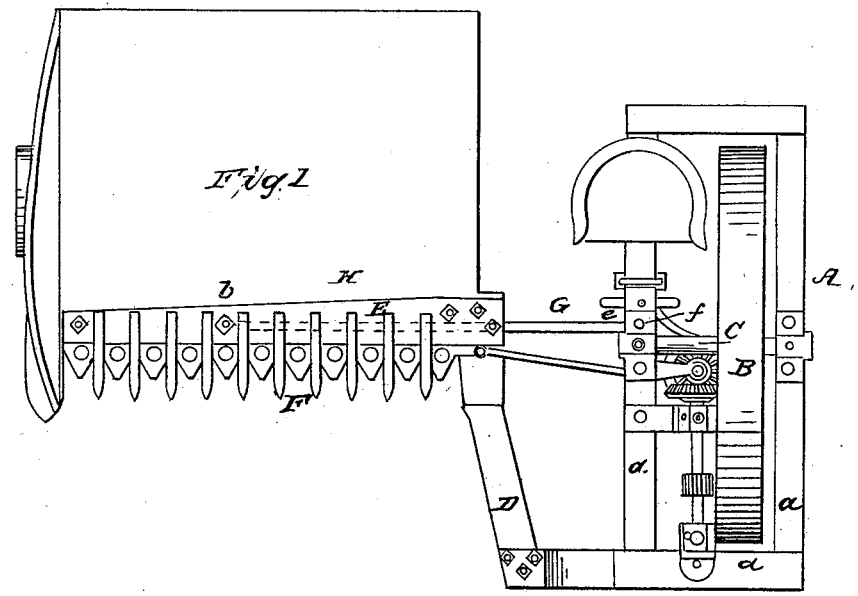
Fig. 1
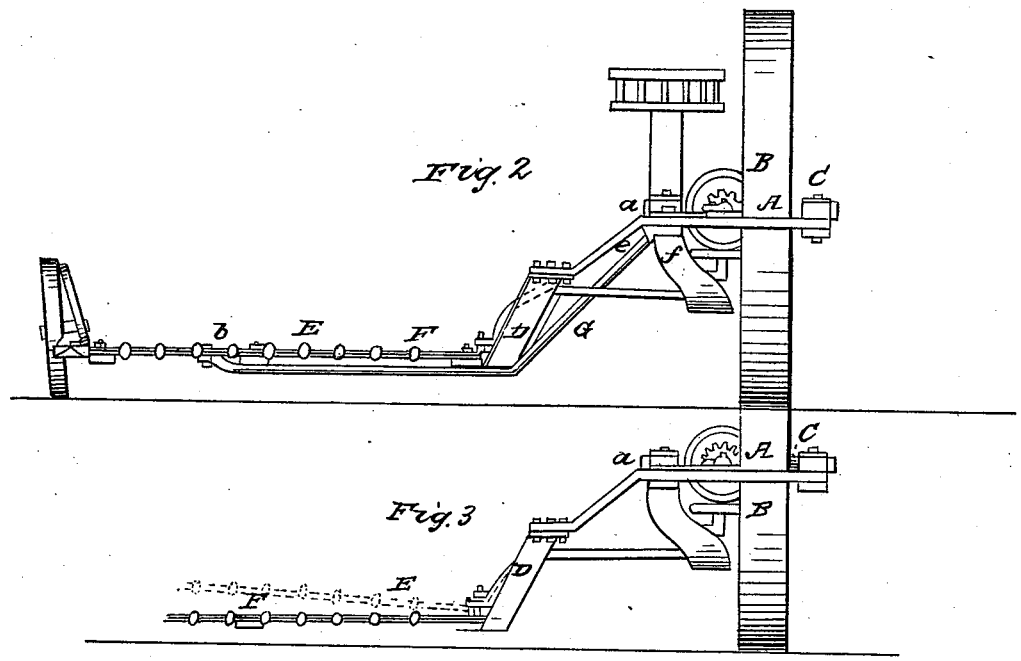
Fig. 2
Fig. 3

UNITED STATES PATENT OFFICE.

WM. F. KETCHUM, OF BUFFALO, NEW YORK.

IMPROVEMENT IN GRAIN AND GRASS HARVESTERS.

Specification forming part of Letters Patent No. 14,102, dated January 15, 1856.

*To all whom it may concern:*

Be it known that I, WILLIAM F. KETCHUM, of Buffalo, in the county of Erie and State of New York, have invented certain new and useful Improvements in Grain and Grass Harvesters; and I do hereby declare that the following is a full, clear, and exact description of the same, reference being had to the annexed drawings, making a part of this specification, in which—

Figure 1 is a plan or top view of my improvement. Figs. 2 and 3 are front elevations of the same.

Similar letters of reference indicate corresponding parts in the several figures.

To enable others skilled in the art to fully understand and construct my invention, I will proceed to describe it.

A represents the frame of the machine, in which the driving-wheel B is placed, the axis C of the driving-wheel working in suitable bearings on the frame A. The frame A of the machine is formed of metal bars $a$, secured together in rectangular form. The front bar of the frame projects beyond the inner side of the frame A, is bent or curved downward, and has an inclined metallic bar, D, attached to it. To the lower end of the bar D the cutter-bar E is attached. The bar D is made of a suitable width and thickness, so as to support properly the cutter-bar and still allow a requisite elasticity to the cutter-bar.

When the machine is used as a mower the only attachment of the cutter-bar E to the frame A consists of the bar D.

In mowing the cutter-bar is brought near the surface of the ground, (see Fig. 3,) as grass is cut as near the surface of the ground as possible. It is important, therefore, that the cutter-bar be made to yield or give to correspond to the inequalities of the ground. By referring to Fig. 3 it will be seen that the cutter-bar, in consequence of being attached to the frame A by the bar D, only has a sufficient degree of elasticity imparted to it to allow either end of the cutter-bar to be raised in case of obstructions, or the whole of the cutter-bar may be raised bodily, the bar D being sufficiently elastic to allow this.

By this improvement the sickle F, which works in the fingers of the cutter-bar in the usual manner, is raised or lowered and inclined, according to the nature of the ground over which it passes, and the grass will consequently be cut at a close and uniform distance from the surface of the ground, however irregular the surface may be.

In the cutting of grain the sickle and cutter-bar are raised considerably above the surface of the ground, for it is not important to cut close. In this case the cutter-bar should have no elasticity, but remain perfectly firm and rigid as the machine is drawn along. I therefore attach one end of a bar or rod, G, to the under side of the cutter-bar E by a bolt, $b$, (see Figs. 1 and 2,) the rod passing upward around the inner end of the cutter-bar, and passing through a lip or projection, $e$, attached to the inner bar, $a$, of the frame A. The end of the bar or rod G has a screw-thread cut on it, on which a nut, $f$, is fitted, and by turning which the bar or rod G is strained or drawn sufficiently tight to perfectly support the cutter-bar in a firm and rigid state.

When the machine is used for cutting grain a platform, H, is attached to the cutter-bar.

By the above invention I obtain, first, an elastic or yielding cutter-bar when the implement is used for cutting grass, so that the sickle will cut close to the surface of the ground and conform to its irregularities; and, second, when the implement is used for cutting grain the cutter-bar and platform are supported in a firm and rigid state.

By this improvement it will also be seen that a free or uninterrupted space is allowed between the inner end of the platform and the frame A, so that the cut grain may be raked from the platform and off of its inner edge without being obstructed by braces and supports.

Having thus described my invention, what I claim as new, and desire to secure by Letters Patent, is—

Supporting the cutter-bar E and platform H, when the implement is used as a grain-harvester, by the bar or rod G, in addition to the bar D, said bar or rod being arranged or attached to the cutter-bar E and frame A, as shown and described, for the purpose set forth.

W. F. KETCHUM.

Witnesses:
A. R. HAIGHT,
J. W. COOMB.